United States Patent
Elliott et al.

(10) Patent No.: US 10,270,731 B2
(45) Date of Patent: Apr. 23, 2019

(54) SYSTEMS AND METHODS FOR PROVIDING SHARED CONTENT-BASED MINUTIAE POST RECOMMENDATIONS

(71) Applicant: Facebook, Inc., Menlo Park, CA (US)

(72) Inventors: Stephen Patrick Elliott, London (GB); Volodymyr Giginiak, London (GB)

(73) Assignee: Facebook, Inc., Menlo Park, CA (US)

( * ) Notice: Subject to any disclaimer, the term of this patent is extended or adjusted under 35 U.S.C. 154(b) by 484 days.

(21) Appl. No.: 14/981,897

(22) Filed: Dec. 28, 2015

(65) Prior Publication Data
US 2017/0187668 A1    Jun. 29, 2017

(51) Int. Cl.
*G06F 15/16* (2006.01)
*H04L 12/58* (2006.01)

(52) U.S. Cl.
CPC .............. *H04L 51/32* (2013.01); *H04L 51/14* (2013.01)

(58) Field of Classification Search
CPC ............... G06Q 50/01; G06Q 30/0224; G06F 17/30867; G06F 3/0481
See application file for complete search history.

(56) References Cited

U.S. PATENT DOCUMENTS

| | | | | |
|---|---|---|---|---|
| 7,797,421 B1* | 9/2010 | Scofield | .................. | G06F 17/30 709/224 |
| 7,966,395 B1* | 6/2011 | Pope | ................. | G06F 17/30867 709/224 |
| 8,386,509 B1* | 2/2013 | Scofield | ............. | G06F 17/30867 707/706 |
| 9,607,273 B2* | 3/2017 | Srinivasan | ........... | G06N 99/005 |
| 9,710,567 B1* | 7/2017 | Lobdell | ................ | G06F 17/3089 |
| 2007/0266031 A1* | 11/2007 | Adams | .............. | G06F 17/30286 |
| 2008/0228868 A1* | 9/2008 | Sivakoff | ................ | G06Q 10/10 709/203 |
| 2013/0081084 A1* | 3/2013 | Scheer | ............... | H04N 21/2408 725/46 |
| 2014/0181205 A1* | 6/2014 | Sherrets | .................. | G06F 17/30 709/204 |
| 2014/0201178 A1* | 7/2014 | Baecke | ............. | G06F 17/30038 707/706 |
| 2014/0222819 A1* | 8/2014 | Dies | .................. | G06F 17/30707 707/740 |
| 2014/0250176 A1* | 9/2014 | Sohn | ....................... | H04L 67/20 709/204 |
| 2014/0279190 A1* | 9/2014 | Severinghaus | .... | G06Q 30/0631 705/26.7 |
| 2015/0127748 A1* | 5/2015 | Buryak | .................... | H04L 51/32 709/206 |
| 2015/0193685 A1* | 7/2015 | Srinivasan | ........... | G06N 99/005 706/11 |
| 2015/0193889 A1* | 7/2015 | Garg | ...................... | G06Q 50/01 705/14.49 |
| 2015/0264415 A1* | 9/2015 | Hutchings | ............ | H04N 21/252 725/94 |

(Continued)

*Primary Examiner* — Shean Tokuta
(74) *Attorney, Agent, or Firm* — Sheppard Mullin Richter & Hampton LLP

(57) ABSTRACT

Systems, methods, and non-transitory computer-readable media can receive shared content information associated with a content item selected by a user for sharing on a social networking system. A minutiae post recommendation is determined based on the shared content information. The minutiae post recommendation is presented on a user device.

15 Claims, 10 Drawing Sheets

(56) References Cited

U.S. PATENT DOCUMENTS

| | | | | |
|---|---|---|---|---|
| 2015/0269488 A1* | 9/2015 | Galai | .................... | H04L 67/22 |
| | | | | 706/11 |
| 2015/0350349 A1* | 12/2015 | Kao | ...................... | H04L 67/18 |
| | | | | 709/204 |
| 2015/0370909 A1* | 12/2015 | Volach | .............. | G06Q 30/0269 |
| | | | | 707/722 |
| 2016/0125451 A1* | 5/2016 | Garg | ................ | G06Q 30/0243 |
| | | | | 705/14.42 |
| 2016/0255082 A1* | 9/2016 | Rathod | ................. | H04L 63/10 |
| | | | | 726/1 |
| 2016/0292794 A1* | 10/2016 | Sedayao | ............... | G06Q 10/00 |

\* cited by examiner

SYSTEMS AND METHODS FOR PROVIDING SHARED CONTENT-BASED MINUTIAE POST RECOMMENDATIONS

FIELD OF THE INVENTION

The present technology relates to the field of social networks. More particularly, the present technology relates to providing minutiae post recommendations.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with various tools that make it easier to create richer, high quality content posts. For example, social networking systems may provide various images, moving images, videos, graphics and the like, that can be used to enhance content posts. Social networking systems value higher quality content posts because they are more interesting to other users, thus providing a more robust social network with high quality content and increased user-engagement.

SUMMARY

Various embodiments of the present disclosure can include systems, methods, and non-transitory computer readable media configured to receive shared content information associated with a content item selected by a user for sharing on a social networking system. A minutiae post recommendation is determined based on the shared content information. The minutiae post recommendation is presented on a user device.

In an embodiment, the shared content information comprises minutiae information, and determining a minutiae post recommendation based on the shared content information comprises determining a minutiae post recommendation based on the minutiae information.

In an embodiment, the minutiae information is received in a query string parameter.

In an embodiment, determining a minutiae post recommendation based on the shared content information comprises determining a default minutiae post recommendation based on a URL of the content item.

In an embodiment, determining a minutiae post recommendation based on the shared content information comprises determining a default minutiae post recommendation based on content provider information indicative of a content provider of the content item.

In an embodiment, the content provider information comprises a content provider URL.

In an embodiment, the shared content information comprises minutiae information, and the minutiae information comprises a verb and an object associated with the content item.

In an embodiment, the minutiae information is received in a query string parameter having a verb field and an object field.

In an embodiment, the minutiae post recommendation is presented on a user device for revision by a user.

In an embodiment, the shared content information comprises a URL associated with the content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
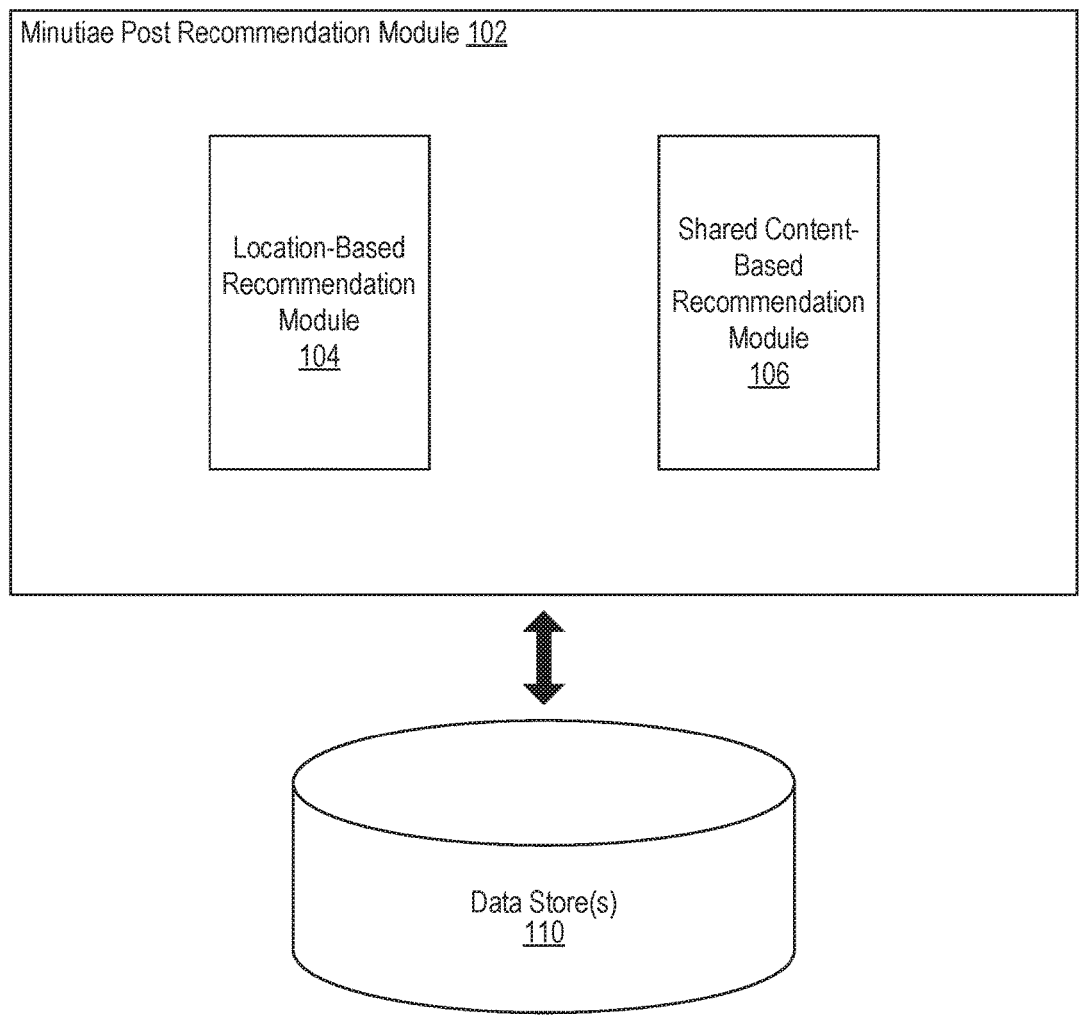
FIG. 1 illustrates an example system including a minutiae post recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Minutiae Post Recommendations

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can be provided with various tools that make it easier to create richer, high quality content posts. For example, social networking systems may provide various images, moving images, videos, graphics and the like, that can be used to enhance content posts. Social networking systems value higher quality content posts because they are more interesting to other users, thus providing a more robust social network with high quality content and increased user-engagement.

It continues to be an important interest for a social networking system to provide users with tools to easily create high quality content posts on the social networking system. As such, it would be useful if a social networking system could provide tools to assist users in creating detail-rich, quality content posts. However, it can be difficult providing such tools in an intuitive, non-intrusive manner. Many current systems include recommendations systems that suggest content that users may be interested in viewing, e.g., pages or images that may be of interest to the user, but fail to provide useful tools or recommendations for users to create their own interesting content posts.

An improved approach rooted in computer technology overcomes the foregoing and other disadvantages associated with conventional approaches specifically arising in the realm of computer technology. Based on computer technology, the disclosed technology can provide minutiae post recommendations based on contextual information. In various embodiments, a minutiae post recommendation can be generated based on a user's location information. The minutiae post recommendation can include minutiae information which provide details of a user's activities. Examples of minutiae information determined based on a user's location information may include an entity associated with the user's current location, one or more activities associated with the user's current location, one or more objects associated with the user's current location, etc. For example, if a user's location indicates that the user is in a café (e.g., Café X), one or more minutiae post recommendations may be presented to the user based on that information (e.g., "I am drinking a latte in Café X"). In various embodiments, a minutiae post recommendation can be generated based on shared content identified by the user. The minutiae post recommendation can include minutiae information based on the shared content. For example, if a user wishes to share a video clip of a television episode that the user is streaming online, contextual information can be pulled from the shared content, in this case a video clip, to provide a minutiae post recommendation that includes details of the user's activities (e.g., "I am watching Top Chef on BravoTV.com"). As used herein, the terms minutiae or minutiae information include any verbs or objects that may be associated with a user's activity. Minutiae information provides details and depth to social network posts. For example, in the social network post recommendation "I am drinking a latte in Café X," the minutiae information includes "drinking," "latte," and "Café X." Similarly, in the social network post recommendation "I am watching Top Chef on BravoTV.com," the minutiae information includes "Top Chef" and "BravoTV.com." Minutiae posts are social network posts which include such minutiae information. As will be made clear by the following disclosure, many variations and embodiments are possible.

FIG. 1 illustrates an example system 100 including an example minutiae post recommendation module 102 configured to generate minutiae post recommendations, according to an embodiment of the present disclosure. The minutiae post recommendation module 102 can be configured to generate one or more minutiae post recommendations based on contextual information. The minutiae post recommendations include details regarding a user's current actions, i.e., minutiae information, so as to create more detailed, interesting social network posts. In various embodiments, a minutiae post recommendation can be generated based on location-based information. The minutiae post recommendation module 102 can determine a user's location and provide one or more minutiae post recommendations based on the user's location to assist the user in drafting and posting a minutiae social network post. In various embodiments, a minutiae post recommendation can be generated based on shared content identified by a user. The minutiae post recommendation module 102 can gather details regarding the shared content, and recommend one or more minutiae posts based on the details of the shared content.

As shown in the example of FIG. 1, the minutiae post recommendation module 102 can include a location-based recommendation module 104 and a shared content-based recommendation module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The location-based recommendation module 104 can be configured to determine a user's location and to determine minutiae information about the user's potential activities based on the user's location. Information available publicly and/or to a social networking system may be utilized to determine details about the user's potential activities. The location-based recommendation module 104 can be further configured to generate one or more minutiae post recommendations based on the user's location and the minutiae information. For example, if the location-based recommendation module 104 determines that the user is in a restaurant, the location-based recommendation module 104 can determine that it is probable that the user is eating one of the restaurant's most popular dishes, and suggest one or more social network posts based on this information, for example: "I am eating a Cronut at Dominique Ansel Bakery." The user can select one of the minutiae post recommendations for posting to a social networking system. The user can post the minutiae post recommendation as is, or can edit the minutiae post recommendation before posting to the social networking system. Providing the user with minutiae post recommendations provides the user with an easy, low-friction way to post interesting, detailed social network posts. The location-based recommendation module 104 is discussed in greater detail herein.

The shared content-based recommendation module 106 can be configured to generate one or more minutiae post recommendations based on shared content identified by a user. For example, the user may wish to share an article that the user is reading on a website, or may want to share a video that the user is watching on a streaming service. When the user elects to share the selected shared content, the shared content-based recommendation module 106 can determine details about the shared content and determine one or more minutiae post recommendations. For example, if a user selects an article to share on a social networking system, the shared content-based recommendation module 106 can determine the source of the article (e.g., The Washington Post), and can infer that the user is likely "reading." Rather than simply posting a link to the selected article without any additional details or information, the shared content-based recommendation module 106 can provide a minutiae post recommendation which recommends that the user post the sentence "I am reading an article on The Washington Post," along with the shared content. The minutiae post recommendation provides an easy way for the user to post detailed social network posts, leading to interesting and engaging social network posts. The shared content-based recommendation module 106 is discussed in greater detail herein.

The minutiae post recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the minutiae post recommendation module 102 can be implemented, in part or in whole, as software running on one or more computing devices or systems, such as on a server computing system or a user (or client) computing system. For example, the minutiae post recommendation module 102 or at least a portion thereof can be implemented as or within an application (e.g., app), a program, or an applet, etc., running on a user computing device or a client computing system, such as the user device 710 of FIG. 7. In another example, the minutiae post recommendation module 102 or at least a portion thereof can be implemented using one or more computing devices or systems that include one or more servers, such as network servers or cloud servers. In some instances, the minutiae post recommendation module 102 can, in part or in whole, be implemented within or configured to operate in conjunction with a social networking system (or service), such as the social networking system 730 of FIG. 7. It should be understood that there can be many variations or other possibilities.

The minutiae post recommendation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the minutiae post recommendation module 102. For example, the data store 110 can store various minutiae associated with various locations, minutiae associated with various content sources or shared content, and the like. It is contemplated that there can be many variations or other possibilities.

Figure 2:
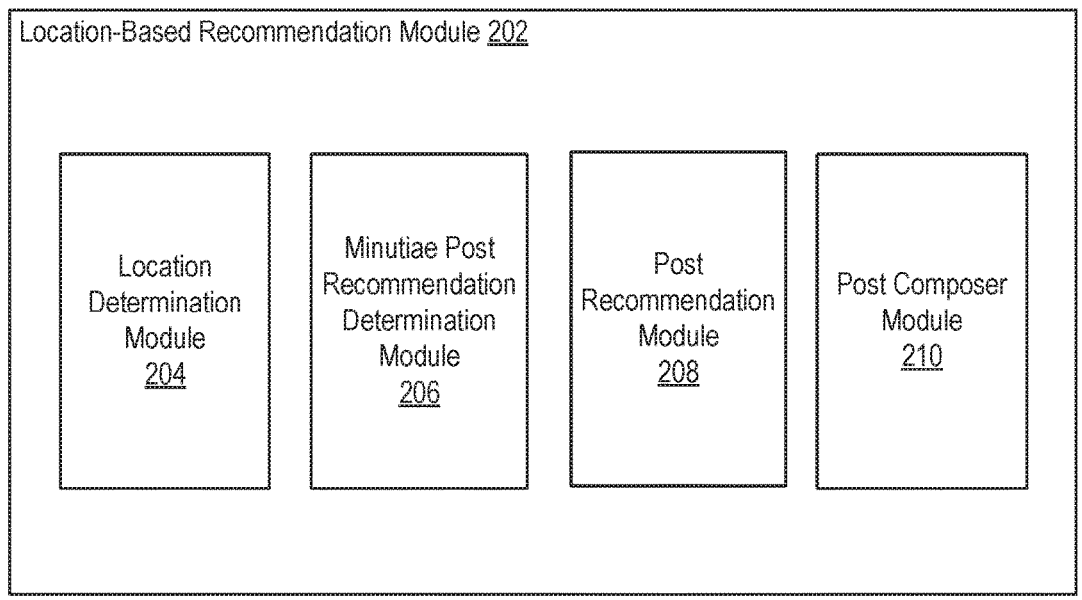
FIG. 2 illustrates an example location-based recommendation module, according to an embodiment of the present disclosure.

FIG. 2 illustrates an example location-based recommendation module 202 configured to provide minutiae post recommendations based on user location information, according to an embodiment of the present disclosure. In some embodiments, the location-based recommendation module 104 of FIG. 1 can be implemented as the example location-based recommendation module 202. As shown in FIG. 2, the location-based recommendation module 202 can include a location determination module 204, a minutiae post recommendation determination module 206, a post recommendation module 208, and a post composer module 210.

The location determination module 204 can be configured to receive user location information indicative of a user's location, and to determine the user's location based on the user location information. In certain embodiments, a user's location can be determined by tracking the location of the user's mobile device. Various sources can provide user location information to assist in determining a user's location. Examples of sources of user location information include GPS, Bluetooth beacons, near-field communications, and the like. A user's location may be determined to varying degrees of precision based on the source of the user location information. For example, GPS tracking may be used to determine a user's address, while Bluetooth beacons can be used to determine what room within a particular building the user is in, or what seat within a room the user is occupying.

The minutiae post recommendation determination module 206 can be configured to determine one or more minutiae post recommendations based on user location information. User location information can be used to determine minutiae information used to generate minutiae post recommendations. For example, user location information can be used to determine the address of the user's current location, which can then be matched to a particular entity. The term entity is used broadly, and includes anything that can be associated with a location, for example, a merchant, vendor, service provider, corporation, business, person, animal, event, etc. The particular entity associated with the user's current location can be one piece of minutiae information, and can also be associated with additional minutiae information. For example, if it is determined that the user is currently at a Café, then certain minutiae terms that may be commonly associated with cafes can be compiled, e.g., drinking, coffee, latte, cappuccino, espresso, scone, muffin, etc. Furthermore, the specific entity identified, e.g., the particular café being visited by the user, can include more specific minutiae terms. For example, if the user is visiting Urth Caffe, rather than using the generic terms associated with all cafes, the minutiae terms "Spanish latte" or "bread pudding" or "pumpkin pie" can be used. User location information can be used to determine one or more entities, which can then be used to determine one or more minutiae terms associated with those entities.

In certain embodiments, rather than using minutiae terms to generate minutiae post recommendations, minutiae information can include one or more pre-specified minutiae post recommendations. As discussed above, user location information can be used to determine one or more entities associated with the user's current location. As discussed in the examples above, these entities can be associated with one or more minutiae terms that can be used to generate minutiae post recommendations. In addition to being associated with minutiae terms, entities can also be associated with pre-specified minutiae post recommendations. For example, rather than (or in addition to) the Urth Caffe being associated with the minutiae terms "Spanish latte," "bread pudding," and "pumpkin pie," Urth Caffe can be associated with the pre-specified minutiae posts: "I am drinking a Spanish latte at Urth Caffe," "I am eating the bread pudding at Urth Caffe," and/or "I am eating pumpkin pie at Urth Caffe."

Minutiae information, such as the minutiae terms and pre-specified minutiae post recommendations discussed above, can be associated with an entity in a variety of ways.

In various embodiments, minutiae information can be associated with an entity based on previous minutiae posts associated with the entity on a social networking system. A social networking system can analyze minutiae posts that are associated with an entity, and determine the minutiae information that is most commonly used in conjunction with the entity. Minutiae posts associated with an entity may include minutiae posts by third parties which tag or otherwise identify the entity, or minutiae posts by the entity itself. For example, Dominique Ansel Bakery may be most often associated with the minutiae terms cronut and cookie shot, or the minutiae post "I am eating a cronut." Sprinkles bakery may be most often associated with the minutiae terms "cupcake" and "red velvet" or the minutiae post "I love Sprinkles' red velvet cupcakes." In various embodiments, the entity itself can define minutiae information to be associated with the entity. For example, the entity may have a page on a social networking system associated with the entity, and content may be posted to the entity's page by administrators. Administrators can define minutiae information that the entity wishes to associate with itself. For example, an administrator of Dominique Ansel Bakery's page can identify the terms "cronut" and "cookie shot." These terms can be used to generate minutiae post recommendations. The administrator can also specify minutiae post recommendations that the entity would like recommended to users on the social networking system, e.g., "I am eating the original Cronut at the Dominique Ansel Bakery."

It may be the case that an entity may be associated to some degree with many different minutiae terms or several pre-specified minutiae post recommendations. As such, the minutiae post recommendation determination module 206 can be configured to compile a set of candidate minutiae post recommendations based on various candidate criteria, and then rank and/or filter the candidate minutiae post recommendations based on ranking and/or filtering criteria. The set of candidate minutiae post recommendations can include minutiae post recommendations generated from minutiae terms as well as pre-specified minutiae post recommendations. The set of candidate minutiae post recommendations can include a merged set of candidate minutiae post recommendations from third party users and from the entity. In certain embodiments, candidate minutiae post recommendations can be ranked based on the popularity of the minutiae information (e.g., minutiae terms or minutiae post recommendations that were used more frequently by past users are ranked higher). The ranked candidate minutiae post recommendations can be filtered such that only the top candidates are presented to the user, e.g., the top 5 candidate minutiae post recommendations. Candidate minutiae post recommendations can also be ranked and/or filtered based on a quality determination, e.g., based on grammatical quality.

In various embodiments, the ranking and/or filtering criteria can include location criteria and/or time criteria. The location and time criteria can be used to provide more granular details about different activities that may be taking place in different locations within a location, and at different times at the same location. One example of such a scenario might occur when a user visits a movie theater. Different theaters within the same movie theater may show different films, and the same theater may show different films at different times. As such, the minutiae post recommendations presented to the user may be dependent on the user's location within a particular location, and the time. For example, if the user is standing in the lobby, the user may be presented with the minutiae post recommendation "I am about to watch a movie at the Cinemark Century Cinema 16," or "I am in line to get popcorn at the Cinemark Century Cinema 16." However, once the user enters a particular theater at a particular time, the specific time and location information can be used to rank and/or filter different candidate minutiae post recommendations, and the user can be presented with the minutiae post recommendation "I am watching the 8:40 p.m. showing of The Avengers in Theater 8 at the Cinemark Century Cinema 16."

The post recommendation module 208 can be configured to present one or more minutiae post recommendations for potential selection by a user. In various embodiments, the post recommendation module 208 can utilize an interface on a user device to present one or more minutiae post recommendations based on user location information. In certain embodiments, when a user enters a location, an application on the user's mobile device may notify the user that location-specific information is available. The location-specific information may include information that may be useful or interesting to the user, e.g., past photos posted by other users from the same location, reviews of the merchant posted by other users from the same location, and the like. The user may also be provided with one or more minutiae post recommendations, based on the user's current location, that the user can select and post to a social networking system. An example user interface is described below with reference to FIG. 3A.

The post composer module 210 can be configured to provide an interface that allows a user to revise a minutiae post recommendation before posting it to a social networking system. For example, a composer interface can be presented to a user once the user has selected a minutiae post recommendation. The user can revise the text of the minutiae post recommendation, or add an image or video, or tag other users before posting. An example composer interface is described below with reference to FIG. 3B.

Figure 3A:
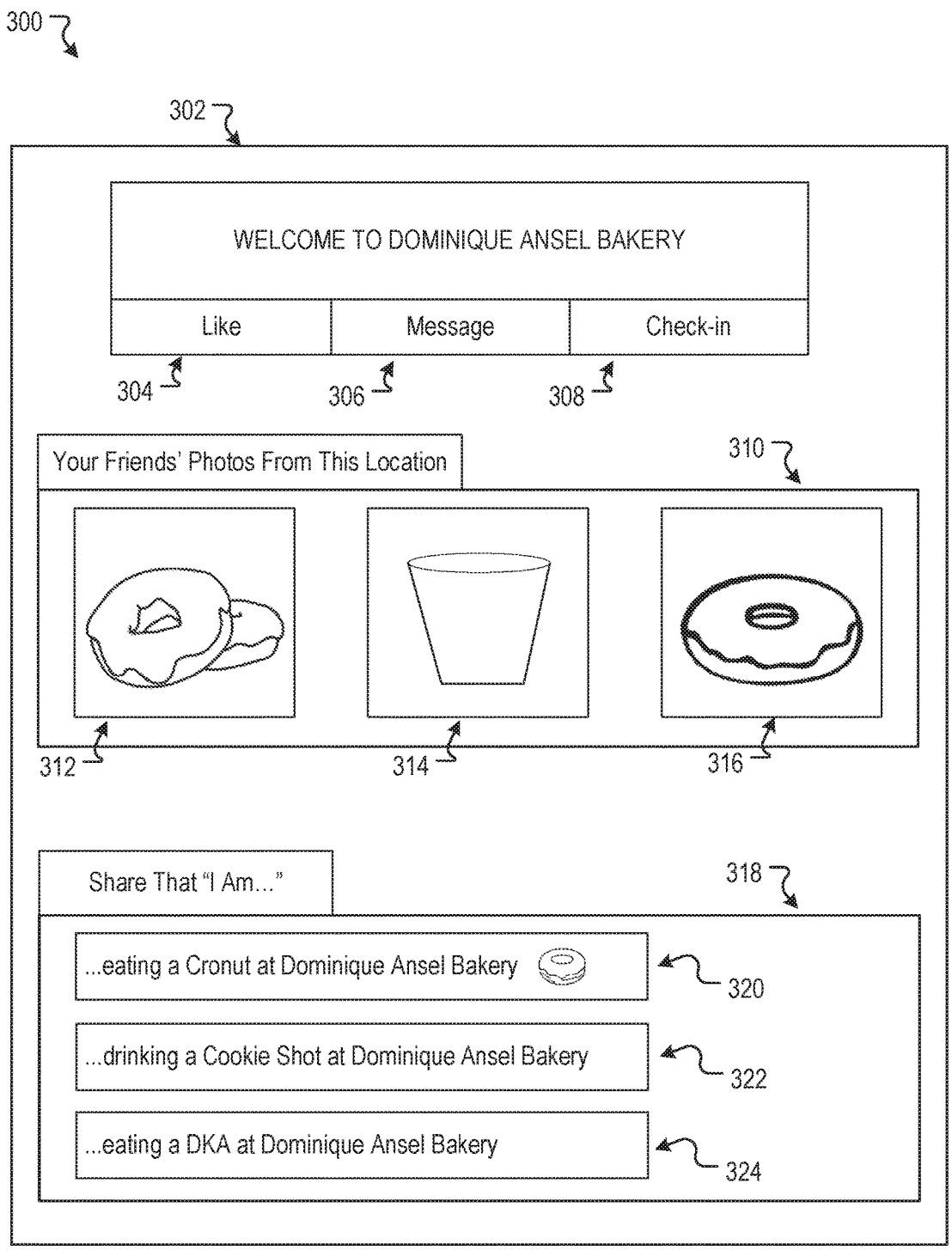
FIG. 3A illustrates an example scenario including a location-based post recommendation interface, according to an embodiment of the present disclosure.

FIG. 3A illustrates an example scenario 300 including an example user interface 302 configured to present location-based minutiae post recommendations to a user. The example interface 302 shows a page associated with an entity, the Dominique Ansel Bakery. The user is provided with a "Like" button 304 to like the entity's page, a "Message" button 306 to send a message to an administrator of the page, and a "Check-In" button 308 to indicate on a social networking system that the user is visiting the entity. A shared photos section 310 include various photos 312, 314, 316 that were previously shared by other users from the same location. A minutiae post recommendations section 318 presents various minutiae post recommendations 320, 322, 324 that are associated with the user's current location. By selecting one of the minutiae post recommendations 320, 322, 324, the user can cause a composer interface to presented in which the user can revise the minutiae post recommendation before posting it to a social networking system.

Figure 3B:
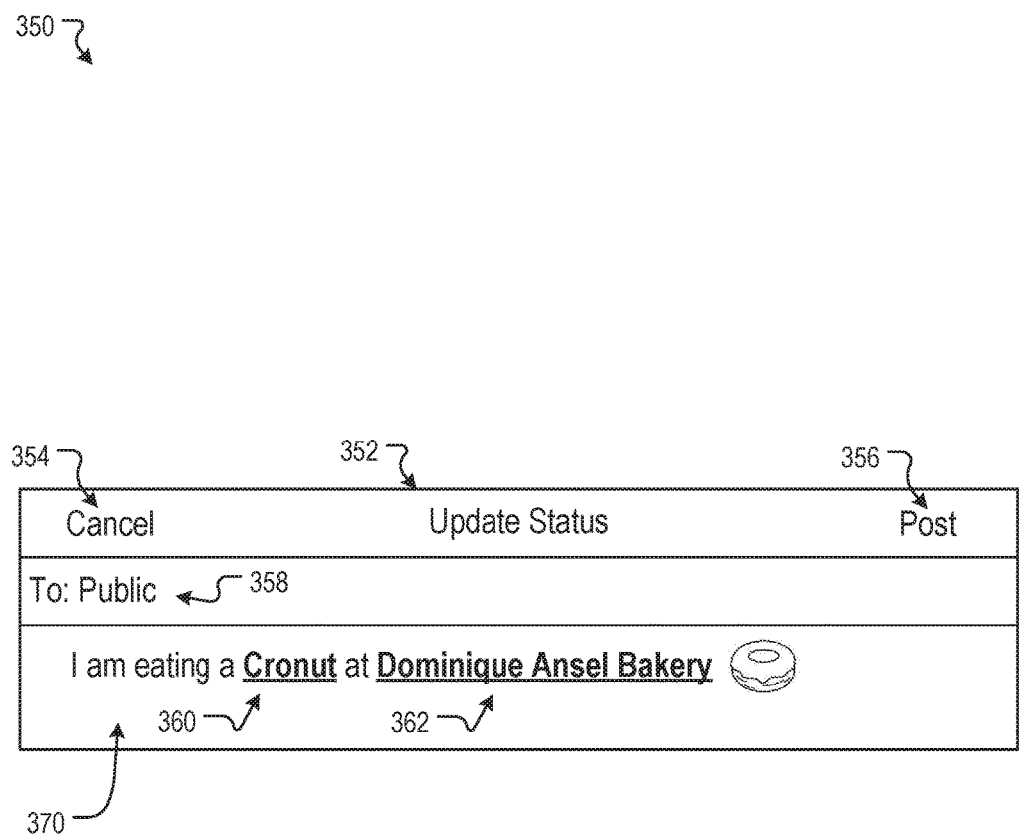
FIG. 3B illustrates an example scenario including a location-based post composer interface, according to an embodiment of the present disclosure

FIG. 3B illustrates an example scenario 350 including an example composer interface 352 configured to assist a user in composing a social network post for posting to a social networking system. In this example scenario, the user has selected a media post recommendation 320 from FIG. 3A. The selected minutiae post recommendation is presented in the composer interface 352 as a minutiae post 370. The user can revise the minutiae post 370 in various ways, such as adding text, removing text, adding an image, adding video, tagging other users, etc. The minutiae post 370 includes two hyperlinked terms 360, 362 ("cronut" and "Dominique Ansel Bakery.") The hyperlinked terms 360, 362 can allow viewers of the minutiae post to click on the hyperlinked term to direct them to another webpage associated with the hyperlinked term. For example, clicking on the hyperlinked term "Cronut" can take users to a page on a social networking system associated with cronuts. Clicking on the hyperlinked term "Dominique Ansel Bakery" can take users to a page on a social networking system associated with the Dominique Ansel Bakery, or to the Dominique Ansel Bakery website. The user can select an audience for the post using a pull-down menu 358, cancel the minutiae post with a "Cancel" button 354, or post the minutiae post using a "Post" button 356.

Figure 4:
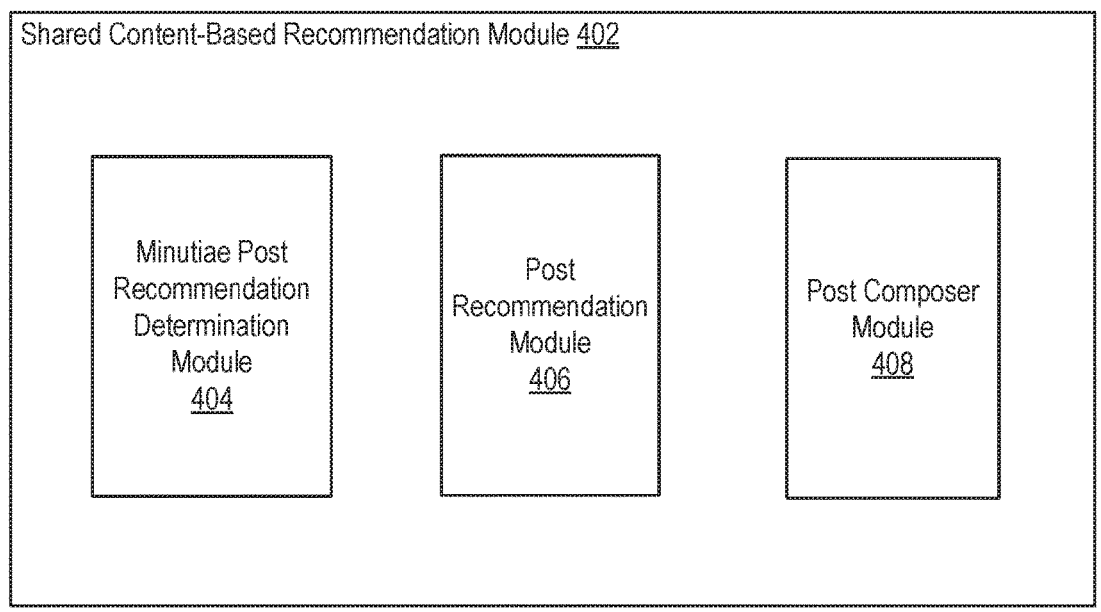
FIG. 4 illustrates an example shared content-based recommendation module, according to an embodiment of the present disclosure.

FIG. 4 illustrates an example shared content-based recommendation module 402 configured to provided minutiae post recommendations based on shared content information, according to an embodiment of the present disclosure. In some embodiments, the shared content-based recommendation module 106 of FIG. 1 can be implemented as the example shared content-based recommendation module 402. As shown in FIG. 4, the shared content-based recommendation module 402 can include a minutiae post recommendation determination module 404, a post recommendation module 406, and a post composer module 408.

The minutiae post recommendation determination module 404 can be configured to determine one or more minutiae post recommendations based on shared content information. In various embodiments, a user can select content to share on a social networking system. For example, if a user is reading an article on a publication's website, the user can click on a button to share the article on the user's profile on a social networking system. Similarly, if a user is watching an episode of a TV show on a streaming service website, the user can click on a button to share the TV episode on the social networking system. The minutiae post recommendation determination module 404 can be configured to receive shared content information identifying content that a user wishes to share on a social networking system, and to determine one or more minutiae post recommendations based on the shared content information.

Similar to the systems and methods described above with respect to location-based minutiae post recommendations, shared content may include various minutiae information, such as minutiae terms and/or pre-specified minutiae post recommendations, associated with the shared content. Minutiae information can be associated with a particular piece of shared content, or with the source of the shared content. For example, if a user wants to share an article titled "Election Results and News" from Washington Post.com, a pre-specified minutiae post recommendation might be associated with the article itself, and the minutiae post recommendation might read "I am reading the article 'Election News and Results' at the Washington Post.com." Alternatively, one or more pre-specified minutiae post recommendations can be associated with the source of the content, such that any content shared from the same content provider or source results in the same minutiae post recommendations being presented to the user. For example, any time a user shares any content from the Washington Post, the same three minutiae post recommendations can be presented, e.g., "I really enjoyed this article from the WashingtonPost.com"; "I found this article from the WashingtonPost.com very interesting"; and "Here is an interesting video from the WashingtonPost.com."

Association of minutiae information with various pieces of shared content and/or content providers can be carried out in several ways. In certain embodiments, a content provider can specify minutiae information to be associated with the content provider or a particular piece of content provided by the content provider. For example, content providers can provide a "Share" button or selectable option that allows a user to share content on a social networking system. The "Share" button can be coded such that when it is clicked, the social networking system is provided with information identifying the shared content, as well as associated minutiae information. For example, the social networking system can be provided with a URL for the shared content, as well as additional query string parameters containing the minutiae information. If a user wants to share an article from the Washington Post, the article's URL might be "www.washingtonpost.com/article." Minutiae information can be provided by including one or more query string parameters having a particular format, e.g., "&verb=<object>." In the example of an article from the Washington Post, the query string parameter might read "&reading=<The Washington Post>." Using this information, the social networking system can provide a link to the shared content ("www.washingtonpost.com/article") and create a minutiae post recommendation based on the minutiae information provided by the content provider, e.g., "I am reading the Washington Post." The "object" field can, in certain embodiments, identify an alias for the content provider on the social networking system, such that the minutiae post recommendation can include in the minutiae post recommendation a hyperlink to the content provider's page on the social networking system. For example, in the minutiae post recommendation "I am reading the Washington Post," the term "Washington Post" can be hyperlinked to the Washington Post's page on the social networking system.

In various embodiments, a social networking system can determine and store minutiae information associated with a content provider or specific content items. If minutiae information is not provided by a content provider, or the social networking system simply wishes to content provider specified minutiae information with its own, the social networking system can create its own record of minutiae information associated with content providers or content items. In certain embodiments, the social networking system can create a set of minutiae information rules associating content providers or content items with one or more default minutiae post recommendations. For example, a minutiae information rule could be defined such that content shared from a particular content provider results in presentation of one or more default minutiae post recommendations that the social networking system has associated with the content provider. For example, any content having a URL that begins with "theguardian.com" can lead to a default minutiae post recommendation of "Reading the Guardian." The social networking system can create broader rules for content providers, and can also create more specific rules for particular pieces or sets of content. For example, the social networking system can store the URL associated with a particular content item (e.g., an article on the Guardian titled "Paris Climate Talks To Take Place This Week" having the URL www.theguardian.com/parisclimatetalksthisweek), and can associate that particular content item with a more specific minutiae post recommendation, e.g., "I am reading the article "Paris Climate Talks to Take Place This Week" on TheGuardian.com." Content item-specific minutiae post recommendations can be generated from content item URLs that follow a particular pattern that can be used to infer minutiae information. For example, if URLs on the Guardian read www.theguardian.com/ArticleTitle, then the "ArticleTitle" can be used to fill in minutiae information in a minutiae post recommendation. If particular content items have content item-specific minutiae information specified, but other content items do not, then a broader, more content provider-based minutiae post recommendation can be used, e.g., "I am reading the Guardian."

The post recommendation module 406 can be configured to present one or more minutiae post recommendations for potential selection by a user. In various embodiments, the post recommendation module 406 can utilize an interface on a user device to present one or more minutiae post recommendations based on shared content information. In certain embodiments, when a user selects an option to share content, the user can be provided with one or more minutiae post recommendations based on the shared content. The one or more minutiae post recommendation can be associated with the shared content itself, or with the content provider of the shared content. Once the user selects one of the one or more minutiae post recommendations (or if there is only one minutiae post recommendation), the user can be presented with a composer interface for revising and posting the selected minutiae post.

The post composer module 408 can be configured to allow a user to revise a minutiae post recommendation before posting it to a social networking system. For example, a composer interface can be presented to a user once the user has selected minutiae post recommendation. The user can revise the minutiae post recommendation by, for example, revising the text of the minutiae post, adding an image or video, or tagging other users or a location.

Figure 5:
FIG. 5 illustrates an example scenario including a shared content-based post composer interface, according to an embodiment of the present disclosure.

FIG. 5 illustrates an example scenario 500 including an example composer interface 502 configured to assist a user in composing a shared content minutiae post for posting to a social networking system. The composer interface 502 includes a minutiae post 508. The minutiae post 508 includes the minutiae information "watching Top Chef at BravoTV.com." The terms Top Chef and BravoTV.com are selectable hyperlinks 504, 506. The hyperlink 504 can be configured to direct a viewer to a page on the social networking system associated with the show Top Chef, and the hyperlink 506 can be configured to direct a viewer to BravoTV.com, or to a page on the social networking system associated with Bravo TV. These hyperlinks may be automatically provided by a social networking system based on minutiae information. For example, when minutiae information includes "Top Chef," the social networking system can automatically determine that the term "Top Chef" should be hyperlinked to direct a user to the Top Chef page on the social networking system. The composer interface 502 also includes a shared content link 510 which, when selected, directs a viewer of the minutiae post to the shared content, e.g., by opening the URL of the shared content. The composer interface 502 allows a user to revise the text of the minutiae post 508, tag people in the post (button 512), tag a location in the post (button 514), select an audience for the post (drop down menu 516), cancel the post (button 518), or post to the social networking system (button 520).

Figure 6A:
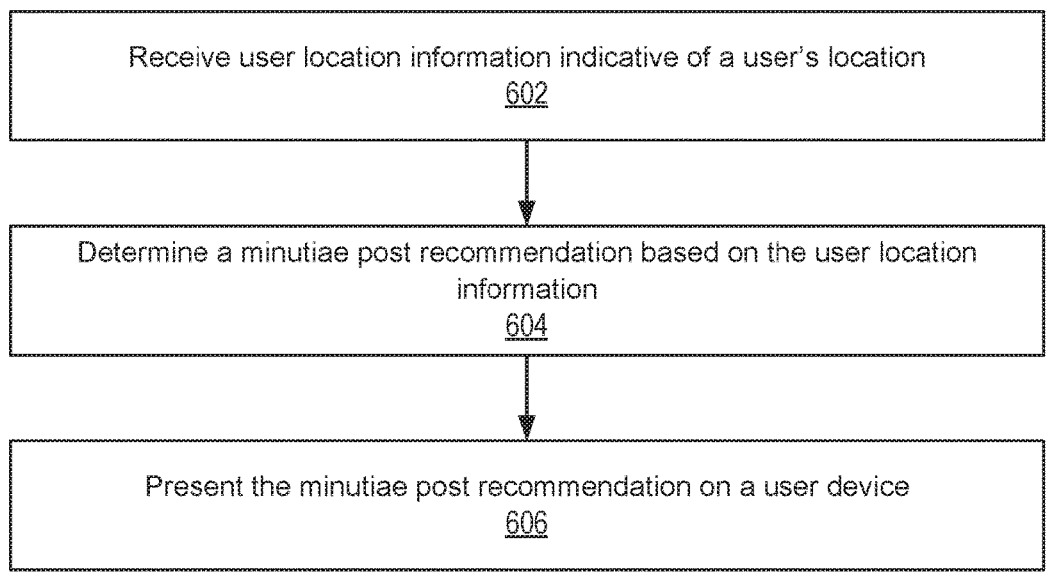
FIG. 6A illustrates an example method for providing a location-based minutiae post recommendation, according to an embodiment of the present disclosure.

FIG. 6A illustrates an example method 600 associated with providing a location-based minutiae post recommendation to a user, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can receive user location information indicative of a user's location. At block 604, the example method 600 can determine a minutiae post recommendation based on the user location information. At block 606, the example method 600 can present the minutiae post recommendation on a user device. Other suitable techniques that incorporate various features and embodiments of the present technology are possible.

Figure 6B:
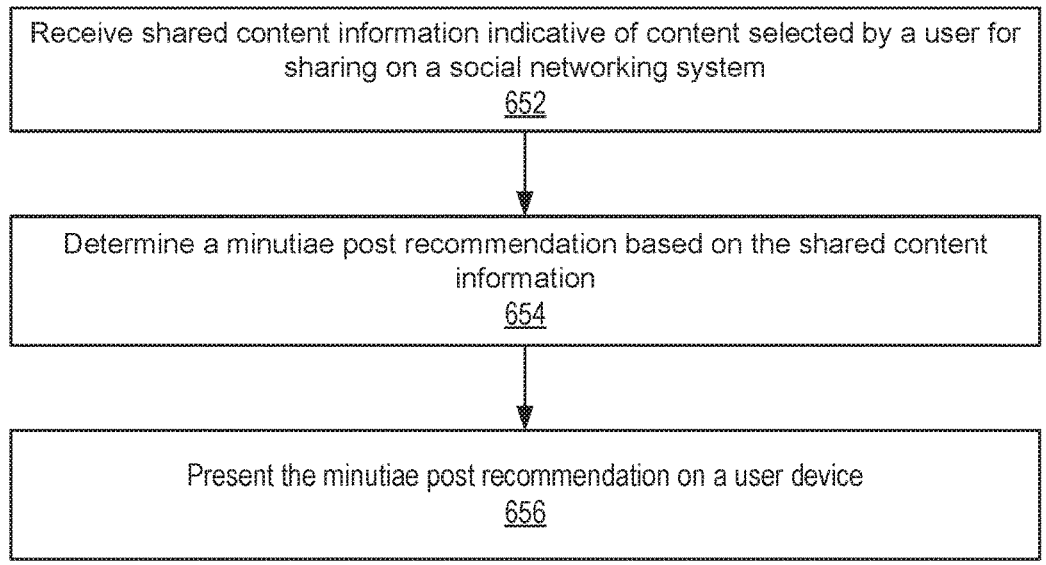
FIG. 6B illustrates an example method for providing a shared content-based minutiae post recommendation, according to an embodiment of the present disclosure.

FIG. 6B illustrates an example method 650 associated with providing a shared content-based minutiae post recommendation to a user, according to an embodiment of the present disclosure. It should be appreciated that there can be additional, fewer, or alternative steps performed in similar or alternative orders, or in parallel, based on the various features and embodiments discussed herein unless otherwise stated.

At block 652, the example method 650 can receive shared content information indicative of content selected by a user for sharing on a social networking system. At block 654, the example method 650 can determine a minutiae post recommendation based on the shared content information. At block 656, the example method 650 can present the minutiae post recommendation on a user device. Other suitable techniques that incorporate various features and embodiments of the present technology are possible.

Social Networking System—Example Implementation

Figure 7:
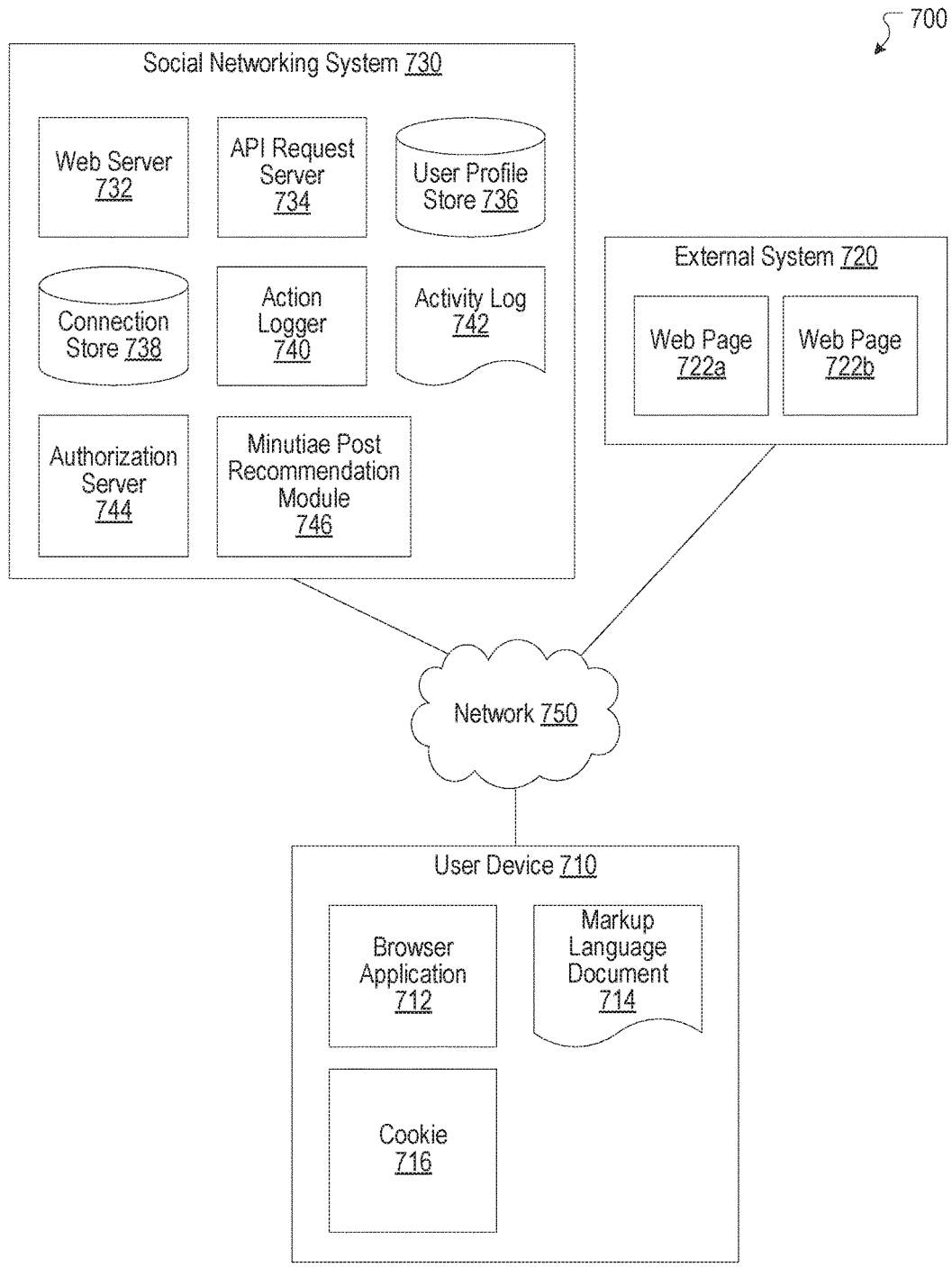
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user may be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This can occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a minutiae post recommendation module 746. The minutiae post recommendation module 746 can, for example, be implemented as the minutiae post recommendation module 102 of FIG. 1. As discussed previously, it should be appreciated that there can be many variations or other possibilities. For example, in some instances, the minutiae post recommendation module 746 (or at least a portion thereof) can be included or implemented in the user device 710. Other features of the minutiae post recommendation module 746 are discussed herein in connection with the minutiae post recommendation module 102.

Hardware Implementation

Figure 8:
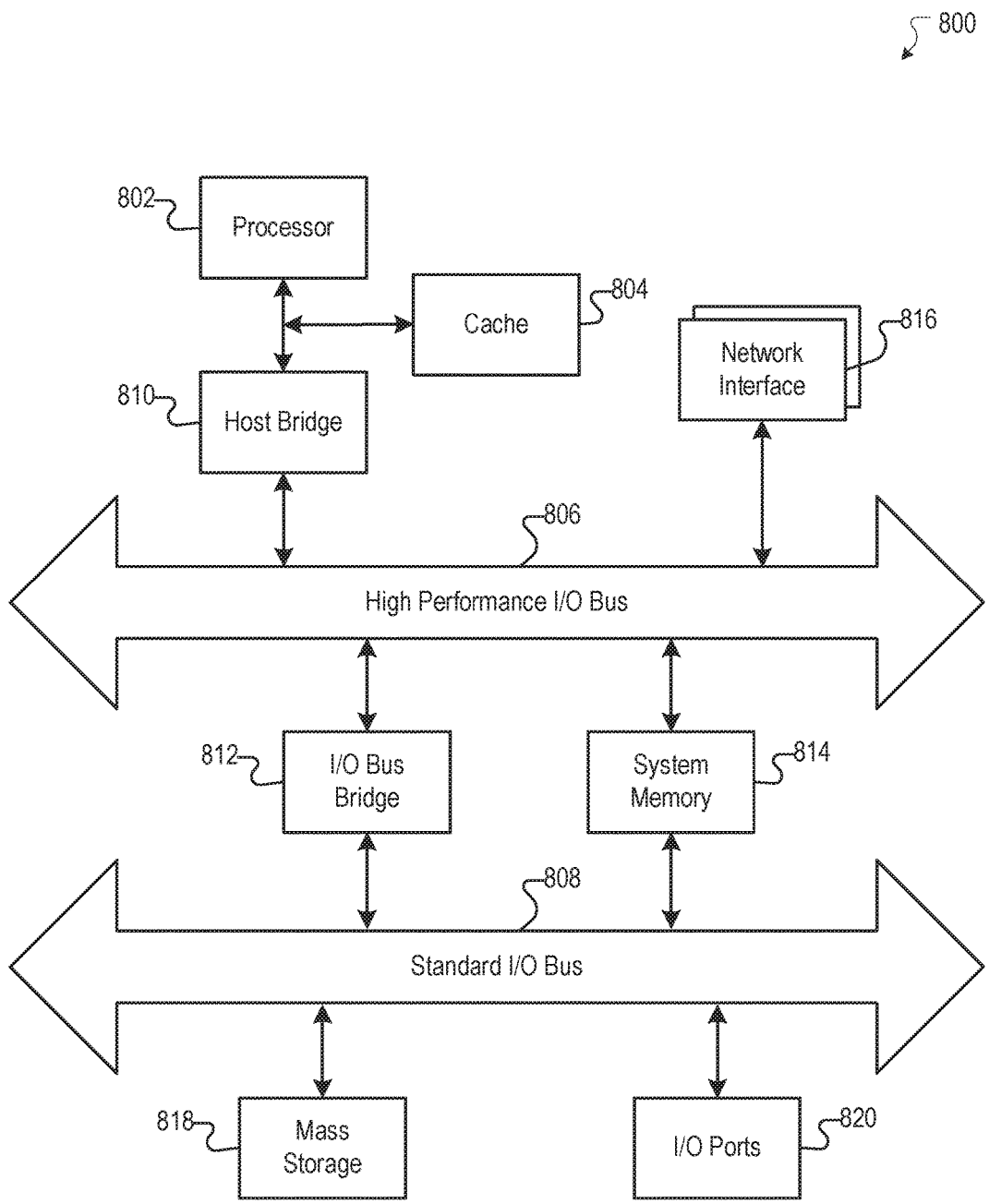
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, shared content information associated with a content item selected by a user for sharing on a social networking system, wherein
   the shared content information comprises minutiae information, the minutiae information comprising a verb and an object associated with the content item, and
   at least a portion of the minutiae information is received in a query string parameter having a verb field and an object field;
   determining, by the computing system, a minutiae post recommendation based on the shared content information; and
   presenting, by the computing system, the minutiae post recommendation on a user device.

2. The computer-implemented method of claim 1, wherein,
   determining a minutiae post recommendation based on the shared content information comprises determining a minutiae post recommendation based on the minutiae information.

3. The computer-implemented method of claim 1, wherein determining a minutiae post recommendation based on the shared content information comprises determining a default minutiae post recommendation based on a URL of the content item.

4. The computer-implemented method of claim 1, wherein determining a minutiae post recommendation based on the shared content information comprises determining a default minutiae post recommendation based on content provider information indicative of a content provider of the content item.

5. The computer-implemented method of claim 4, wherein the content provider information comprises a content provider URL.

6. The computer-implemented method of claim 1, wherein presenting the minutiae post recommendation on a user device comprises presenting the minutiae post recommendation on a user device for revision by a user.

7. The computer-implemented method of claim 1, wherein the shared content information comprises a URL associated with the content item.

8. A system comprising:
   at least one processor; and a memory storing instructions that, when executed by the at least one processor, cause the system to perform a method comprising:

receiving shared content information associated with a content item selected by a user for sharing on a social networking system, wherein the shared content information comprises minutiae information, the minutiae information comprising a verb and an object associated with the content item, and at least a portion of the minutiae information is received in a query string parameter having a verb field and an object field;

determining a minutiae post recommendation based on the shared content information; and presenting the minutiae post recommendation on a user device.

9. The system of claim 8, wherein, determining a minutiae post recommendation based on the shared content information comprises determining a minutiae post recommendation based on the minutiae information.

10. The system of claim 8, wherein determining a minutiae post recommendation based on the shared content information comprises determining a default minutiae post recommendation based on a URL of the content item.

11. The system of claim 8, wherein determining a minutiae post recommendation based on the shared content information comprises determining a default minutiae post recommendation based on content provider information indicative of a content provider of the content item.

12. A non-transitory computer-readable storage medium including instructions that, when executed by at least one processor of a computing system, cause the computing system to perform a method comprising:

receiving shared content information associated with a content item selected by a user for sharing on a social networking system, wherein the shared content information comprises minutiae information, the minutiae information comprising a verb and an object associated with the content item, and at least a portion of the minutiae information is received in a query string parameter having a verb field and an object field;

determining a minutiae post recommendation based on the shared content information; and presenting the minutiae post recommendation on a user device.

13. The non-transitory computer-readable storage medium of claim 12, wherein, determining a minutiae post recommendation based on the shared content information comprises determining a minutiae post recommendation based on the minutiae information.

14. The non-transitory computer-readable storage medium of claim 12, wherein determining a minutiae post recommendation based on the shared content information comprises determining a default minutiae post recommendation based on a URL of the content item.

15. The non-transitory computer-readable storage medium of claim 12, wherein determining a minutiae post recommendation based on the shared content information comprises determining a default minutiae post recommendation based on content provider information indicative of a content provider of the content item.

* * * * *